2,892,685

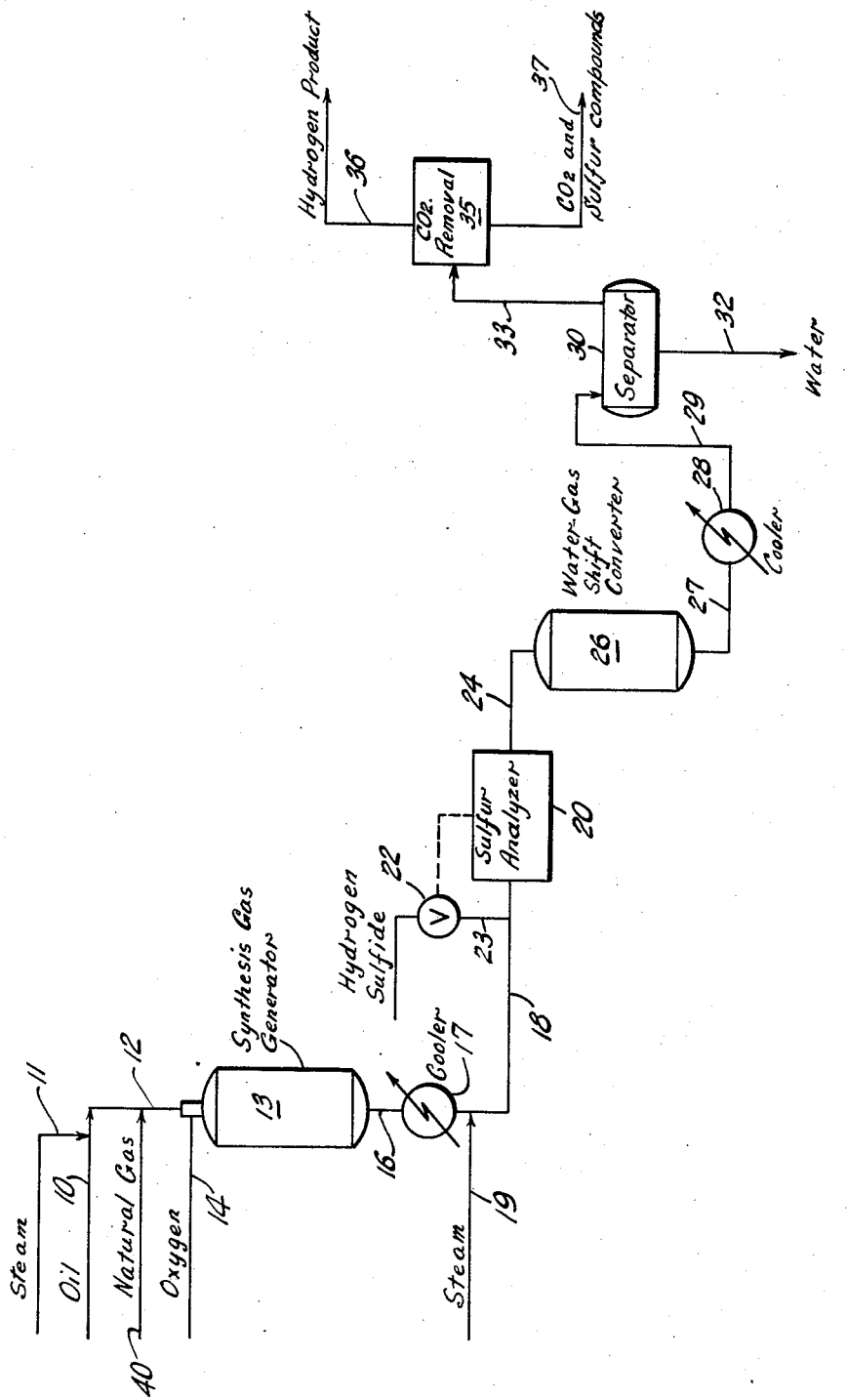

CARBON MONOXIDE CONVERSION PROCESS

Peter L. Paull, Westport, Conn., assignor to Texaco Development Corporation, New York, N.Y., a corporation of Delaware Application December 4, 1957, Serial No. 700,594

5 Claims. (Cl. 23—213)

This invention relates to a method and apparatus for the conversion of carbon monoxide-containing gases and steam to hydrogen. In one of its more specific aspects it is directed to a method of producing hydrogen from carbon monoxide-containing gases of variable sulfur content wherein the sulfur content of the feed gas is continuously maintained above a critical level.

The method of producing hydrogen from carbon monoxide-containing gas by the water-gas shift conversion reaction is well known. In the water-gas shift conversion process, carbon monoxide is reacted with steam at a temperature within the range of about 600° F. to about 1000° F. at a pressure from about atmospheric to about 650 p.s.i.g. in the presence of an iron oxide or iron sulfide catalyst. The amount of steam employed may vary from the stoichiometric amount necessary to react with the carbon monoxide, up to an excess of about 10 volumes of steam per volume of carbon monoxide. Preferably about three to five volumes of steam are used for each volume of carbon monoxide. Iron water-gas shift conversion catalyst is usually prepared from highly purified iron oxide with lesser quantities of the oxides of magnesium, potassium, sodium, aluminum, and chromium. These catalysts usually comprise ferric oxide as manufactured, but are reduced to the ferrous form in use. When the gas processed in the water-gas shift conversion is substantially free of sulfur compounds, the iron oxide is reduced to a ferrous oxide form. When sulfur is present in significant quantities the iron oxide is reduced and sulfided to the ferrous sulfide form. When the sulfur content of the feed gas varies over wide ranges, for example, when fuels free of sulfur are employed alternately with sulfur-containing fuels, the catalyst may be alternately converted to the oxide and the sulfide forms.

Carbon monoxide-containing gases for the production of hydrogen may be produced in various ways, for example, by water-gas generation, steam-methane reforming and by the partial combustion of carbonaceous fuels. The partial combustion process has been developed as a highly efficient and preferred method of producing gases rich in hydrogen and carbon monoxide. Although the process of this invention is applicable to the shift conversion of carbon monoxide-containing gas from any source, it will be described hereinafter as applied to gases produced by the partial oxidation of hydrocarbon and carbonaceous fuels. Carbon monoxide and hydrogen-containing gases produced by partial oxidation are commonly referred to as synthesis gas which term will be used hereinafter. Synthesis gases produced by partial oxidation vary greatly in the content of sulfur. For example, natural gas is available in many areas containing little or no sulfur. If the natural gas is free of sulfur, the synthesis gas produced therefrom is also free of sulfur. Liquid and solid hydrocarbons and carbonaceous fuels usually contain sulfur which may range up to 4.0 weight percent or higher. Synthesis gas produced from sulfur-containing liquid and solid fuels therefore contain a corresponding amount of sulfur. Frequently it is desirable to employ sulfur-free and sulfur-containing fuels alternately for the production of synthesis gas for conversion to hydrogen, depending upon availability and cost. It has been observed that the alternate use of gaseous and liquid or solid fuels has been accompanied by disintegration of the shift conversion catalyst. Although it is not intended that the process of this invention be limited to any particular mechanism, it is postulated that the catalyst disintegration which has been observed is a result of alternate sulfiding and oxidation of the shift conversion catalyst when feed stocks are employed containing varying amounts of sulfur. According to the process of this invention, disintegration of the catalyst is effectively prevented by continuously maintaining the sulfur content of the feed gas above a critical level. The catalyst in either the sulfided form or in the oxide form is equally satisfactory as a shift catalyst. The shift conversion catalyst may be maintained in the sulfided form by the addition of a minute amount of sulfur to sulfur-free feed gases. For example, at typical water-gas shift conversion conditions, the water-gas shift catalyst may be maintained in the sulfided condition if the gas feed at all times contains at least about 0.2 grain of sulfur per 100 standard cubic feet of feed gas. Although this amount of sulfur is effective to prevent disintegration of the catalyst as a result of alternate oxidation and sulfiding, the amount of sulfur appearing in the product gas is extremely small and may be completely removed when the hydrogen stream is treated for carbon dioxide removal.

Sulfur may be introduced into the shift conversion feed in numerous ways. A convenient method of sulfur introduction is the injection of a gaseous sulfur compound, for example, hydrogen sulfide, carbonyl sulfide or a mercaptan, directly into the shift conversion feed.

The sulfur content of the water-gas shift feed required to maintain the iron catalyst in the sulfide form varies depending upon the amount of water vapor in the feed and the temperature of the shift conversion operation. These variables may be related in accordance with the following equation to determine the sulfur content of the feed gas needed to maintain the catalyst in the sulfide form:

$$\log_{10} S_c = -5.3414 + 4.7409 \times 10^{-3} T \\ -1.4502 \times 10^{-6} T^2 + \log_{10} W$$

where $S_c$ is the critical level of sulfur expressed in grains per 100 standard cubic feet, $T$ is the highest temperature prevailing in the shift conversion catalyst bed and $W$ is the mol percent of water vapor in the shift conversion feed. The critical sulfur level for a wide range of shift conversion conditions varies from about 0.03 to about 0.7 grain per hundred standard cubic feet and typically is below about 0.2 grain per hundred standard cubic feet.

An advantage of the process of this invention is that iron shift conversion catalyst is maintained in sulfide form while alternately processing gas streams containing varying quantities of sulfur. Consequently, the catalyst retains its strength and the increase in pressure drop which would otherwise result from plugging of the bed with disintegrated catalyst is avoided.

The accompanying drawing diagrammatically illustrates one form of the process of this invention. Although the drawing illustrates one arrangement of apparatus in which the process of this invention may be practiced, it is not intended to limit the invention to the particular apparatus or materials described.

A fuel oil, for example, a diesel fuel oil, containing about 0.3 weight percent sulfur, in line 10 is admixed with steam from line 11 and passed through feed manifold 12 to synthesis gas generator 13. Oxygen in line 14 is introduced into gas generator 13 wherein the oil, steam, and oxygen are reacted at an autogenous temperature of about 2600° F. Reaction products comprising carbon monoxide, hydrogen and small quantities of carbon dioxide, water vapor, nitrogen, hydrogen sulfide, and carbonyl sulfide are withdrawn through line 16. The synthesis gas in line 16 is then passed through cooler 17, line 18, and admixed with steam from line 19 to form a water gas shift conversion feed comprising about 50 percent water vapor at a temperature of about 750° F. and containing about 20 grains of sulfur per 100 standard cubic feet. The water-gas shift conversion feed is then passed through sulfur analyzer 20 wherein the stream is continuously analyzed for sulfur content. Responsive to the sulfur analysis obtained by sulfur analyzer 20, a signal is impressed upon control valve 22 in hydrogen sulfide line 23 to maintain valve 22 in a closed position. Water-gas shift conversion feed containing about 20 grains per 100 standard cubic feet in line 24 is passed to water gas shift converter 26. In water-gas shift converter 26 the steam and carbon monoxide react in the presence of an iron shift conversion catalyst to produce hydrogen and carbon dioxide.

Effluent product from water gas shift converter 26 is withdrawn through line 27, cooler 28, and line 29 to separator 30. Water separated in separator 30 is withdrawn for disposal through line 32, and hydrogen-rich gas is withdrawn through line 33. Hydrogen-rich gas in line 33 is passed to carbon dioxide removal unit 35 wherein carbon dioxide and sulfur-containing gases are separated by conventional means, for example by extraction with ethanolamine. Hydrogen product is withdrawn for use through line 36 and carbon dioxide and sulfur compounds are withdrawn for disposal through line 37.

After processing diesel oil is described above, the oil and steam flows are discontinued and a substitute fuel free of sulfur, for example, sweet natural gas is employed. In this case, natural gas in line 40 is passed to fuel feed manifold 12 and thence to synthesis gas generator 13. Sulfur-free reaction products in line 16 pass through cooler 17 and line 18. Steam from line 19 is admixed with the synthesis gas in line 18 to form a water-gas shift conversion feed containing about 50 percent water vapor at a temperature of about 750° F. Water-gas shift conversion feed is passed through sulfur analyzer 20 and line 24 to water-gas shift converter 26. Responsive to the sulfur analysis obtained by sulfur analyzer 20, a signal is impressed upon control valve 22. Valve 22 is opened admitting hydrogen sulfide at a controlled rate through line 23. Hydrogen sulfide is admixed with the water-gas shift conversion feed to establish and maintain a sulfur concentration of about one grain of sulfur per hundred standard cubic feet. Water-gas shift conversion feed containing added sulfur is passed through line 24 to water-gas shift converter 26. The remaining operation is effected in the same way as when diesel fuel oil is employed as fuel feed. The choice of fuel may be varied depending upon the relative availability of fuels at a given time. Obviously, hydrogen sulfide may be separated from the carbon dioxide and recycled for use in maintaining the sulfur level of the water-gas shift converter feed above the desired critical level. However, such a small quantity of hydrogen sulfide is used that it is generally preferred to employ hydrogen sulfide separated from streams which are more highly concentrated than the effluent from carbon dioxide removal unit 35.

In a specific installation for the manufacture of hydrogen by the water-gas shift conversion of a synthesis gas, the following fuels are available for conversion to synthesis gas: A sweet natural gas free of sulfur, a diesel fuel oil containing 0.3 weight percent sulfur and a bunker fuel oil containing 0.98 weight percent sulfur. Synthesis gases produced from the foregoing fuels have the analyses and sulfur contents set forth in the following tabulation:

| Synthesis Gas Generator Fuel | Sweet Natural Gas | Diesel Fuel Oil | Bunker Fuel Oil |
| --- | --- | --- | --- |
| Sulfur, Weight, Percent | None | 0.3 | 0.98 |
| Synthesis Gas, Analysis, Dry Basis, mol Percent— | | | |
| Carbon Monoxide | 35.9 | 45.1 | 50.5 |
| Hydrogen | 60.0 | 49.0 | 43.7 |
| Carbon Dioxide | 1.9 | 0.2 | 3.9 |
| Methane | 0.2 | 0.4 | 0.2 |
| Nitrogen and Argon | 2.0 | 1.3 | 1.4 |
| Sulfur, grains per 100 s.c.f. | None | 41 | 142 |

Sweet natural gas is available as an interruptible supply and is used when available but when the supply is cut off, the fuel requirements of the synthesis gas generator are supplied from a source of diesel fuel oil. In a 6 months' period, sweet natural gas is employed during 6 periods for a total of 57 percent of the total operating time. During the intervening periods when the sweet natural gas is not available, diesel fuel oil is employed for a total of 43 percent of the total operating time. Synthesis gas from the foregoing fuels in admixture with steam is contacted with a water-gas shift conversion catalyst for the production of additional hydrogen. At the beginning of this 6 months' period, fresh iron oxide catalyst is loaded to the water-gas shift conversion reactor and the pressure drop through the reactor bed is about 17 p.s.i.g. After 6 months' operation, the pressure drop through the catalyst bed has risen to 147 p.s.i.g. The catalyst is unloaded and found to contain 17 percent fine material which as been produced by catalyst disintegration.

In this same installation, the foregoing fuels are employed in a subsequent 6 months' period according to the method of this invention. In this period, sweet natural gas is employed as feed stock for 8 periods comprising 51 percent of the total operating time. Interspersed with the periods when sweet natural gas is employed, diesel fuel oil is employed for 6 periods comprising 35 percent of the total operating time and bunker fuel oil is employed for 4 periods during the remaining 14 percent of the operating time. During those periods when diesel fuel oil and bunker fuel oil are employed, the synthesis gas produced contains more than the critical sulfur required to maintain the catalyst in a sulfided condition. During the periods when sweet natural gas is employed, the synthesis gas produced contains no detectable sulfur. During these periods, hydrogen sulfide is continuously added to maintain the sulfur content of the synthesis gas above 1 grain per hundred standard cubic feet. At the beginning of this 6 months' period fresh iron oxide shift converter catalyst is loaded to the shift converter and the pressure drop through the reactor is about 17 p.s.i.g. After 6 months of operation, the pressure drop through the shift converter reactor has risen to about 45 p.s.i.g. At the conclusion of the 6 months' period, the shift converter catalyst is removed from the reactor and about 5 percent of the catalyst is found to have disintegrated or broken into smaller particles than those originally charged. It will be noted by comparison of the above 6 months' periods, that maintenance of at least 1 grain of sulfur per hundred standard cubic feet in the synthesis gas substantially reduces the amount of catalyst disintegration in the shift converter reactor so that catalyst disintegration and resultant pressure drop increase are no longer important problems in the operation of the water-gas shift reactor.

Obviously, many modifications and variations of the invention as hereinbefore set forth may be made without departing from the spirit and scope thereof and only such limitations should be imposed as are indicated in the appended claims.

I claim:

1. In a water-gas shift process employing an iron catalyst wherein gases containing more and less sulfur than the amount necessary to maintain said iron catalyst in sulfide form are processed, the improvement which comprises introducing hydrogen sulfide into said gases containing less sulfur than the amount necessary to maintain said iron catalyst in sulfide form in an amount such that the sulfur content of the gases passed into contact with said catalyst is maintained continuously above the sulfur content necessary to maintain said catalyst in sulfide form.

2. In a water-gas shift process employing an iron catalyst alternately to process gases containing more and less than the critical sulfur content $S_c$ wherein said critical sulfur content $S_c$ is related to the temperature of the shift converter catalyst and steam content of the shift converter feed by the equation $$\log_{10} S_c = -5.3414 + 4.7409 \times 10^{-3} T - 1.4502 \times 10^{-6} T^2 + \log_{10} W$$

where $S_c$ is the critical level of sulfur expressed in grains per 100 standard cubic feet, $T$ is the highest temperature prevailing in the shift conversion catalyst bed and $W$ is the mol percent of water vapor in the shift conversion feed, the improvement which comprises introducing hydrogen sulfide into said gases containing less than the critical sulfur content $S_c$ in an amount such that the sulfur content of said gases is maintained continuously above said critical sulfur content $S_c$.

3. In a water-gas shift process wherein carbon monoxide and steam are contacted with an iron catalyst at a temperature within the range of about 600 to 1000° F. and with a feed ratio of steam to carbon monoxide within the range of about 1 mol of steam per mol of carbon monoxide to about 10 mols of steam per mol of carbon monoxide, and varying in sulfur content greater and less than about 0.7 grain of sulfur per hundred standard cubic feet, the improvement which comprises introducing hydrogen sulfide into said gases containing less than about 0.7 grain of sulfur per hundred standard cubic feet in an amount such that the sulfur content of said gases is maintained continuously about 0.7 grain per hundred standard cubic feet.

4. In a water-gas shift process wherein carbon monoxide and steam are contacted with an iron catalyst at a temperature within the range of about 600 to 1000° F. and with a feed ratio of steam to carbon monoxide within the range of about 1 mol of steam per mol of carbon monoxide to about 10 mols of steam per mol of carbon monoxide, and varying in sulfur content greater and less than about 0.7 grain of sulfur per hundred standard cubic feet, the improvement which comprises determining the sulfur content of said gases and adding hydrogen sulfide responsive to said determination in an amount such that the sulfur content is maintained continuously above 0.7 grain per hundred standard cubic feet.

5. A process for the conversion of fuels of varying sulfur content to hydrogen which comprises effecting partial combustion of a sulfur-containing carbonaceous fuel to produce a sulfur-containing synthesis gas comprising carbon monoxide, hydrogen and in excess of 0.7 grain hydrogen sulfide per hundred standard cubic feet, said hydrogen sulfide containing synthesis gas in admixture with steam, is contacted with an iron water-gas shift conversion catalyst to form additional hydrogen and carbon dioxide, thereafter discontinuing the partial combustion of said sulfur-containing fuel and effecting partial combustion of a carbonaceous fuel substantially free of sulfur to produce a low-sulfur synthesis gas comprising carbon monoxide, hydrogen and less than 0.7 grain of hydrogen sulfide per hundred cubic feet, admixing hydrogen sulfide to said low-sulfur synthesis gas to produce a water-gas shift conversion feed of a sulfur content in excess of 0.7 grain per hundred cubic feet, and contacting said water-gas shift conversion feed in admixture with steam with said iron water-gas shift conversion catalyst to form additional hydrogen and carbon dioxide.

No references cited.